(12) United States Patent
Sawabe et al.

(10) Patent No.: US 7,295,762 B2
(45) Date of Patent: Nov. 13, 2007

(54) INFORMATION RECORD MEDIUM HAVING FIRST AND SECOND RECORDING LAYERS IN WHICH MID AREAS ARE RECORDED RESPECTIVELY, AND APPARATUS FOR RECORDING THE SAME

(75) Inventors: Takao Sawabe, Tokyo-to (JP); Ryuichiro Yoshimura, Tokorozawa (JP); Junichi Yoshio, Tokorozawa (JP); Akihiro Tozaki, Tsurugashima (JP); Yoshiaki Moriyama, Tsurugashima (JP); Kaoru Yamamoto, Tsurugashima (JP)

(73) Assignee: Pioneer Electric Corporation, Tokyo-to (JP)

( * ) Notice: Subject to any disclaimer, the term of this patent is extended or adjusted under 35 U.S.C. 154(b) by 39 days.

(21) Appl. No.: 10/606,831

(22) Filed: Jun. 27, 2003

(65) Prior Publication Data

US 2004/0095812 A1    May 20, 2004

Related U.S. Application Data

(63) Continuation of application No. 08/820,254, filed on Mar. 18, 1997, now abandoned.

(30) Foreign Application Priority Data

Mar. 19, 1996  (JP) .................................. P8-62324

(51) Int. Cl.
*H04N 5/91* (2006.01)
*G11B 3/74* (2006.01)

(52) U.S. Cl. ............................ 386/96; 386/45; 386/95; 386/125; 386/126; 369/94

(58) Field of Classification Search .................. 386/45, 386/95, 125–126, 96, 46, 94; 369/94, 275.3, 369/32.01, 53.31, 59.26, 124.01; *H04N 5/781*
See application file for complete search history.

(56) References Cited

U.S. PATENT DOCUMENTS 5,449,590 A    9/1995  Imaino et al.

(Continued)

FOREIGN PATENT DOCUMENTS

JP    6-176544    6/1994

(Continued)

OTHER PUBLICATIONS

Ineternet posting "History of Research and Development" from http://www.pioneer.co.jp/crdl/org/history-e., date unknown.*

(Continued)

*Primary Examiner*—John Miller
*Assistant Examiner*—Jamie Vent
(74) *Attorney, Agent, or Firm*—Drinker Biddle & Reath LLP

(57) ABSTRACT

An information record medium is provided with a first recording layer on which a data group is recorded, and a second recording layer on which a data group is recorded. On the first recording layer, a lead-in area, management information for the whole of recording information, and the data group are recorded. On the second recording layer, a lead-out area and a data group are recorded. The lead-in area is recorded at the inner radius side of the information record medium. The lead-out area is recorded at the inner radius side of the information record medium. The medium is further provided with a mid area at the outer radius side of the first recording layer, and the other mid area at the outer radius side of the second recording layer.

21 Claims, 8 Drawing Sheets

U.S. PATENT DOCUMENTS

| | | | |
|---|---|---|---|
| 5,602,956 A | | 2/1997 | Suzuki et al. |
| 5,608,715 A | | 3/1997 | Yokogawa et al. |
| 5,636,200 A | | 6/1997 | Taira et al. ............... 369/275.3 |
| 5,684,773 A | | 11/1997 | Hayashi |
| 5,696,743 A | | 12/1997 | Kawasaki |
| 5,726,969 A | | 3/1998 | Moriya et al. |
| 5,870,523 A | | 2/1999 | Kikuchi et al. |
| 6,151,441 A | * | 11/2000 | Kawamura et al. ............ 386/95 |

FOREIGN PATENT DOCUMENTS

| | | |
|---|---|---|
| JP | 6-195944 | 7/1994 |
| JP | 6-236555 | 8/1994 |
| JP | 07-226059 | 8/1995 |
| JP | 7-334939 | 12/1995 |
| WO | WO 95 16990 | 6/1995 |

OTHER PUBLICATIONS

Mike Snider, USA Today, "Supercharged digital video discs are on the way", Sep. 20, 1995 (p. 12D).*

Mike Snider, USA Today, "Consumer Electronics Show's cutting edge//DVD's new super spin on CD format", Jan. 8, 1996 (p. 06.D).*

Laserdisc recording "Thumbelina" published by Warner Home Video, see the outer jacket, 1994.

C Fogg (cfogg@chromatic.com), "A Day at the DVD Forum: technical notes", from http://galaxy.channeli.net/book/dvd.html, Apr. 22, 1996.

Pioneer Electronic Corporation, Operating Instructinos for CD/CDV/LD player model CLD-1070, 1989, pp. 8 and 27.

Laserdisc recording "Fantasia" (1940); published by Walt Disney Home Video; Catalog No. 1132 AS; Nov. 1991, see outer jacket.

Internet Movie Database page listing details about "Fantasia" (1940) laserdisc, from http://us.imdb.com/Laserdisc?0032455 (undated).

"Optical Disc Technology" from http://repairfaq.cis.upenn.edu/sam/icets/opttech.htm (undated).

Internet posting "History of Research and Development" from http://www.pioneer.co.jp/crdl/org/history-e, date unknown.

* cited by examiner

LOGICAL STRUCTRE OF RECORD INFORMATION
(LOGICAL FORMAT)

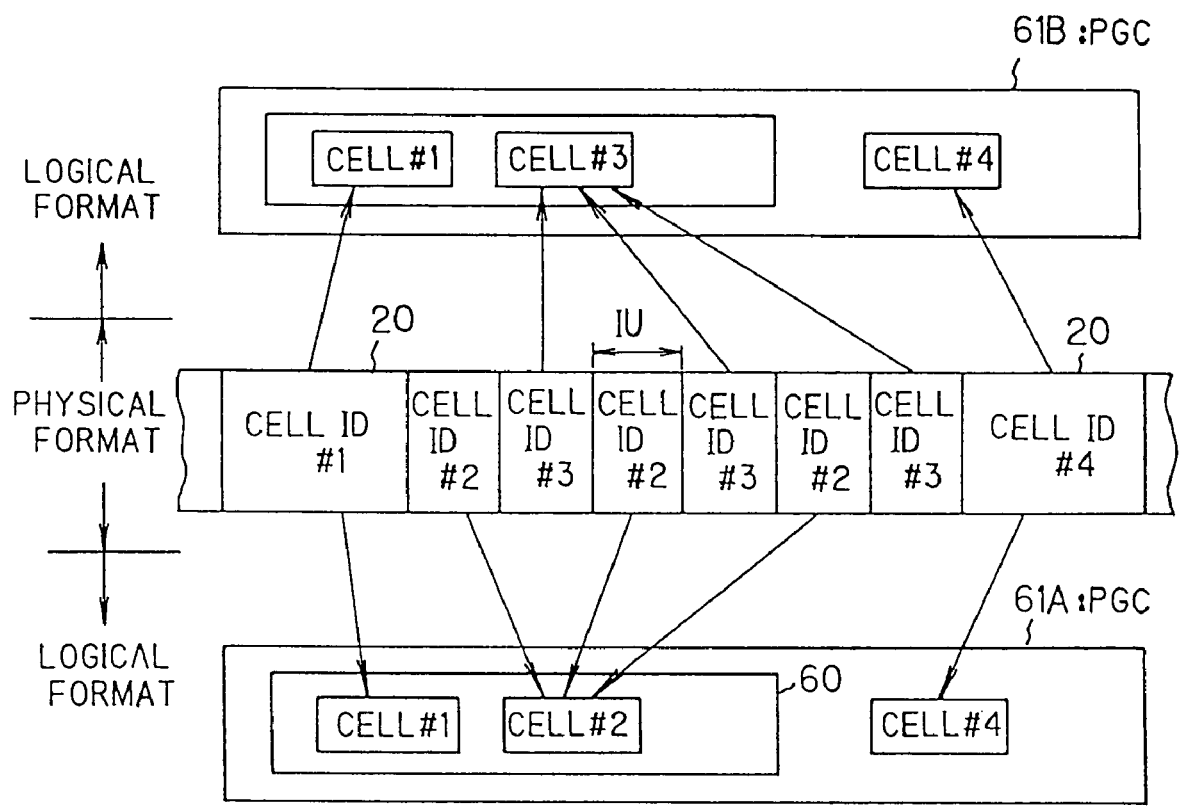

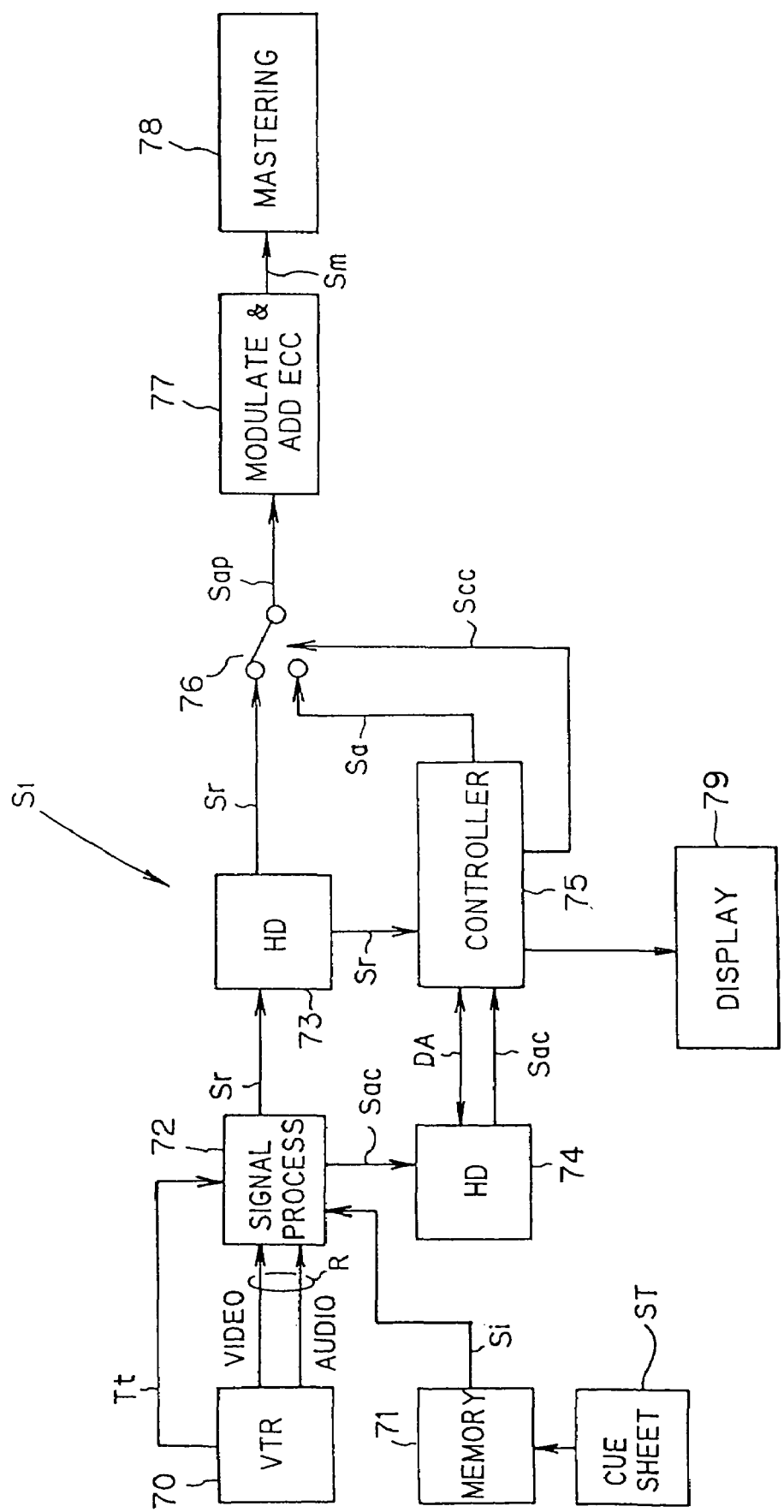

INFORMATION RECORD MEDIUM HAVING FIRST AND SECOND RECORDING LAYERS IN WHICH MID AREAS ARE RECORDED RESPECTIVELY, AND APPARATUS FOR RECORDING THE SAME

This is a continuation of application Ser. No. 08/820,254, filed on Mar. 18 1997 now abandoned.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded music, a reproduction to listen to the recorded music in a random order and soon, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

More specifically, when watching and listening are directed to a foreign movie recorded on an LD, it is impossible to select a language used in a superimposed dialogue displayed on a screen (for example, to select superimposed dialogues in both of the Japanese and original languages) to display them on a screen, or when listening is directed to music recorded on a CD, it is impossible to select a kind of sound or voice in the music (for example, to make alternate selection of lyrics in English language version and Japanese language version for listening).

There have recently been made extensive proposals and development of a DVD as an optical disk having an increased storing capacity by about ten times without modification in its own size in comparison with the aforementioned conventional CD. Such a DVD has been schemed out as having a disk structure comprising two recording layers in order to increase the recording capacity thereof.

In the optical disk having such a double-layer structure, it is necessary to adjust a focal distance of an optical pickup and search an address to be reproduced after the adjustment thereof, when switching the recording layer being in reproduction condition to another recording layer during reproduction. A certain period of time is however required for the aforementioned adjustment of the focal distance and the aforementioned search of the address, thus making it hard to reproduce video information and/or audio information without interruption (in seamless reproduction) in case of continuous data. In view of this case, it is possible to extremely increase a capacity of a track buffer of a reproduction apparatus, or decrease a reproduction velocity thus leading to deterioration of video and audio quality, so as to carry out seamless reproduction. However, the former countermeasure leads to an increase in the production cost of the recording apparatus, and the latter countermeasure is unfavorable for a user.

SUMMARY OF THE INVENTION

It is therefore an object of the present invention to provide an information recording apparatus for recording information so as to permit to carry out seamless reproduction with neither increasing a capacity of a track buffer of a reproduction apparatus nor decreasing are production velocity, when switching a recording layer of an optical disk having a double-layer structure, which is in reproduction condition to another recording layer during reproduction; and an information record medium on which information can be recorded by means of the above-mentioned information recording apparatus.

According to one aspect of the present invention, there is provided an information record medium, on which information is to be recorded by means of an information recording apparatus which sequentially detects an amount of data of each data group to be recorded, sequentially records each of the data group on a first recording layer when a total of the detected amounts of data is equal to or smaller than a first recording capacity, and sequentially records the data group detected lastly on a second recording layer when the total of said detected amounts of data is over said first recording capacity and the amount of data of said data group detected lastly is equal to or smaller than a second recording capacity, which comprises: (1) the first recording layer which has the first recording capacity, and on which the data group having at least one of video information and audio information is recorded as a minimum unit; and (2) the second recording layer which has the second recording capacity, and on which the data group having at least one of video information and audio information is recorded as a minimum unit.

In accordance with the information record medium thus constructed, information is recorded thereon in a manner as described below by means of the information recording apparatus which sequentially detects an amount of data of each data group to be recorded, sequentially records each of the data group on a first recording layer when a total of the detected amounts of data is equal to or smaller than a first recording capacity, and sequentially records the data group detected lastly on a second recording layer when the total of the detected amounts of data is over the first recording capacity and the amount of data of the data group detected lastly is equal to or smaller than a second recording capacity. More specifically, the data group having at least one of video information and audio information is recorded as a minimum unit on the first recording layer having the first recording capacity, and the data group having at least one of video information and audio information is recorded as a minimum unit on the second recording layer having the second recording capacity. Here, "recorded as a minimum unit" means that the data group cannot separately be recorded.

According to another aspect of the present invention, there is provided an information recording apparatus for recording a plurality of data groups each having at least one of video information and audio information on an information record medium provided with a first recording layer having a first recording capacity and a second recording layer having a second recording capacity, which comprises: (1) a data receiving means for sequentially receiving each of the data groups to be recorded on said information record medium; (2) a data-amount detecting means for sequentially detecting an amount of data of each of the received data groups; (3) a first calculating means for sequentially calculating a total of the amounts of data detected by means of said data-amount detecting means; (4) a fist judging means for sequentially judging as whether the total of the amounts of data calculated by means of said first calculating means is equal to or smaller than said first recording capacity; and (5) a first recording means for sequentially recording each of the data groups on said first recording layer, when the total of the amounts of data calculated by means of said firs calculating means is judged to be equal to or smaller than said first recording capacity.

In accordance with the information recording apparatus thus constructed, for recording the plurality of data groups each having at least one of video information and audio information, on the information record medium provided with the first recording layer having the first recording capacity and the second recording layer having the second recording capacity, each of the data groups to be recorded on the information record medium is sequentially received by means of the data receiving means, and an amount of data of each of the received data groups is sequentially detected by means of the data-amount detecting means. A total of the amounts of data detected by means of the data-amount detecting means is sequentially calculated by means of the first calculating means, and there is sequentially judged as whether the total of the amounts of data calculated by means of the first calculating means is equal to or smaller than the first recording capacity, by means of the first judging means. When the total of the amounts of data calculated by means of the first calculating means is judged to be equal to or smaller than the first recording capacity, each of the data groups is sequentially recorded on the first recording layer by means of the first recording means.

According to still another aspect of the present invention, there is provided an information recording apparatus which has the same components as those in the information recording apparatus as described above, and further comprises: (1) a second calculating means for sequentially calculating a total of amounts of data exceeding said first recording capacity when the total of the amounts of data calculated by means of said first calculating means is judged to be over said first recording capacity; (2) a second judging means for sequentially judging as whether the total of the amounts of data calculated by means of said second calculating means is equal to or smaller than said second recording capacity; and (3) a second recording means for sequentially recording the data group exceeding said first recording capacity on said second recording layer when the total of the amounts of data calculated by means of said second calculating means is judged to be equal to or smaller than said second recording capacity.

In accordance with the information recording apparatus thus constructed, when the total of the amounts of data calculated by means of the first calculating means is judged to be over the first recording capacity, a total of amounts of data exceeding the first recording capacity is sequentially calculated by means of the second calculating means, and there is sequentially judged as whether the total of the amounts of data calculated by means of the second calculating means is equal to or smaller than said second recording capacity, by means of the second judging means. When the total of the amounts of data calculated by means of the second calculating means is judged to be equal to or smaller than the second recording capacity, the data group exceeding the first recording capacity is sequentially recorded on the second recording layer by means of the second recording means.

According to further still another aspect of the present invention, there is provided an information recording apparatus which has the same components as those in the information recording apparatus as described above, wherein: the first calculating means calculates the total of the amounts of data detected by means of the data-amount detecting means, in order of quantity of the amounts of data detected thereby.

The nature, utility and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4 is a descriptive view in case that one cell 20 is separately recorded on a plurality of interleaved units IU;

FIG. 5 is a block diagram illustrating a construction of the information recording apparatus for recording control information, video information and audio information on a DVD 1;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, "data group" in claims corresponds to a VTS (Video Title Set).

(I) Embodiment of Information Record Medium

First of all, a physical structure and a logical structure as information record medium to which the present invention is applied, will be explained with reference to FIGS. 1 and 2.

Figure 1:
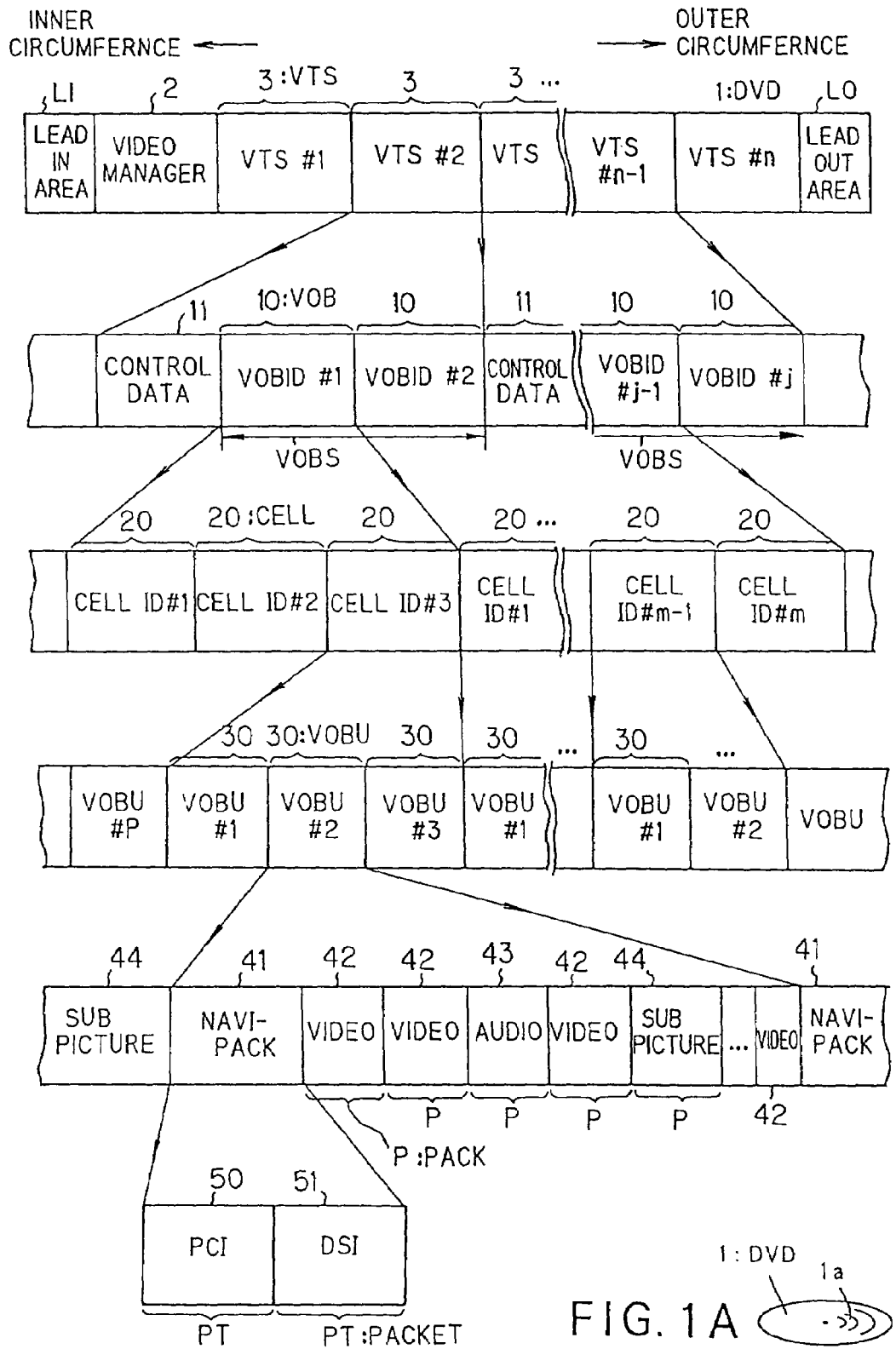
FIG. 1 is a descriptive view of a recording format (a physical recording format) for recording video information and audio information on a DVD.
Figure 2:
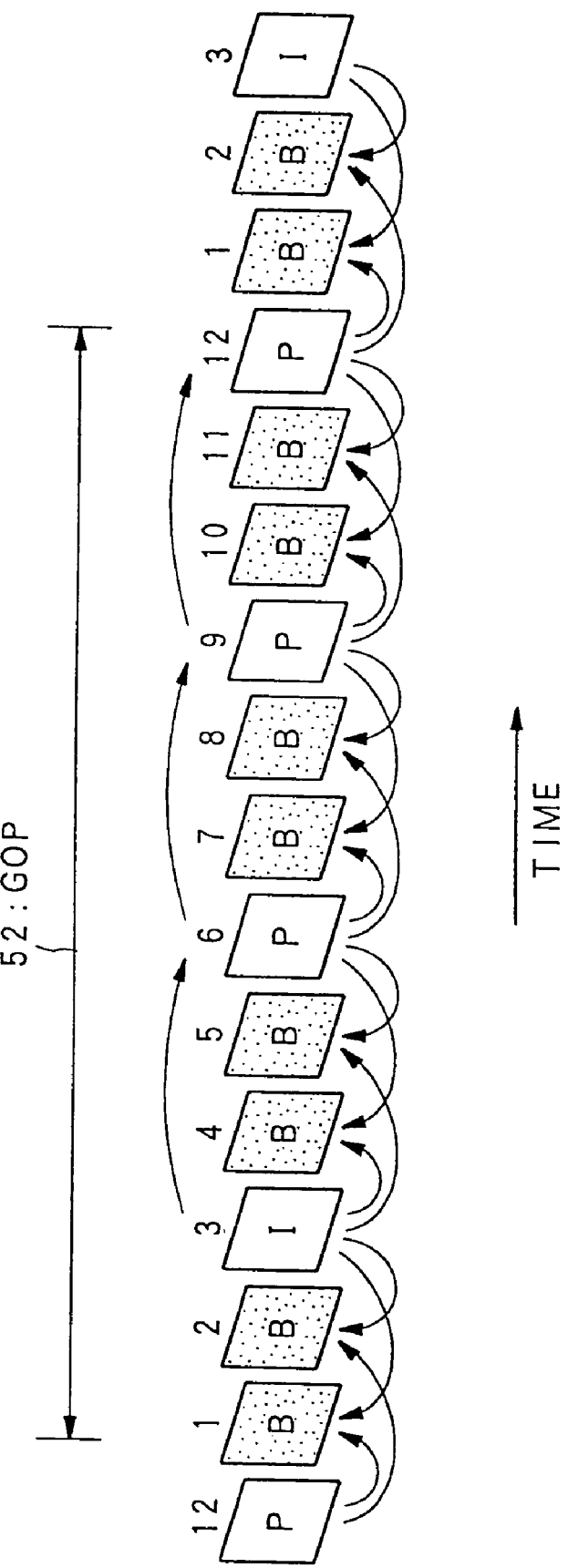
FIG. 2 shows examples of a plurality of frame pictures which construct one GOP 52.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version maybe recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu showing names of the respective titles, information for preventing an illegal copy, an access table for accessing each title and so on, is recorded.

One VTS 3 is recorded such that it is divided into a plurality of VOBs 10, each of which has an ID number (VOB ID#1, VOB ID#2, ... ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the cell will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, ... ). Here, one VOB 10 is constructed such that it is completed by the plurality of cells 20 and that one cell 20 does not extend over two VOBs 10.

Next, one cell 20 is constructed of a plurality of VOB units (VOBUs) 30, each of which has an ID number (VOBU#1, VOBU#2, ... ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41; a video pack 42 having the video information; an audio pack 43 having the audio information; and a sub picture pack 44 having the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. It is prescribed by a standard specification of the DVD that there are 8 kinds of audio recordable on the DVD 1 while 32 kinds of sub picture recordable on the DVD 1.

The recording is made so that the reproduction time for one VOB unit 30 (i.e., the reproduction time for the data recorded between one navi-pack 41 and another navi-pack adjacent thereto) is 0.4 second or longer. Further, the navi-pack 41 always exists at the forefront of one VOB unit. There may not exist each of the video pack 42, the audio pack 43 and the sub picture pack 44 therein, and even in case of their existence, the number of the packs and the order thereof are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP 52 is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Further, the scheme of the above explained GOP 52 is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example.

Among those frame pictures, a frame picture indicated by a reference sign I is called as an I picture (Intra-coded picture), which is defined as a frame picture able to be reproduced as a complete frame picture by use of its own video information. A frame picture indicated by a reference sign P is called as a P picture (Predictive-coded picture), which is defined as a frame picture predicted or generated by decoding a difference from a predictive picture compensated and reproduced on the basis of the already decoded I picture or other picture. A frame picture indicated by a reference sign B is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the authors intention, so as to perform recording on the basis of these set divisions. By performing the reproduction on the basis of a later described logical structure for each of these divisions, the variegated reproduction can be performed.

Next, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
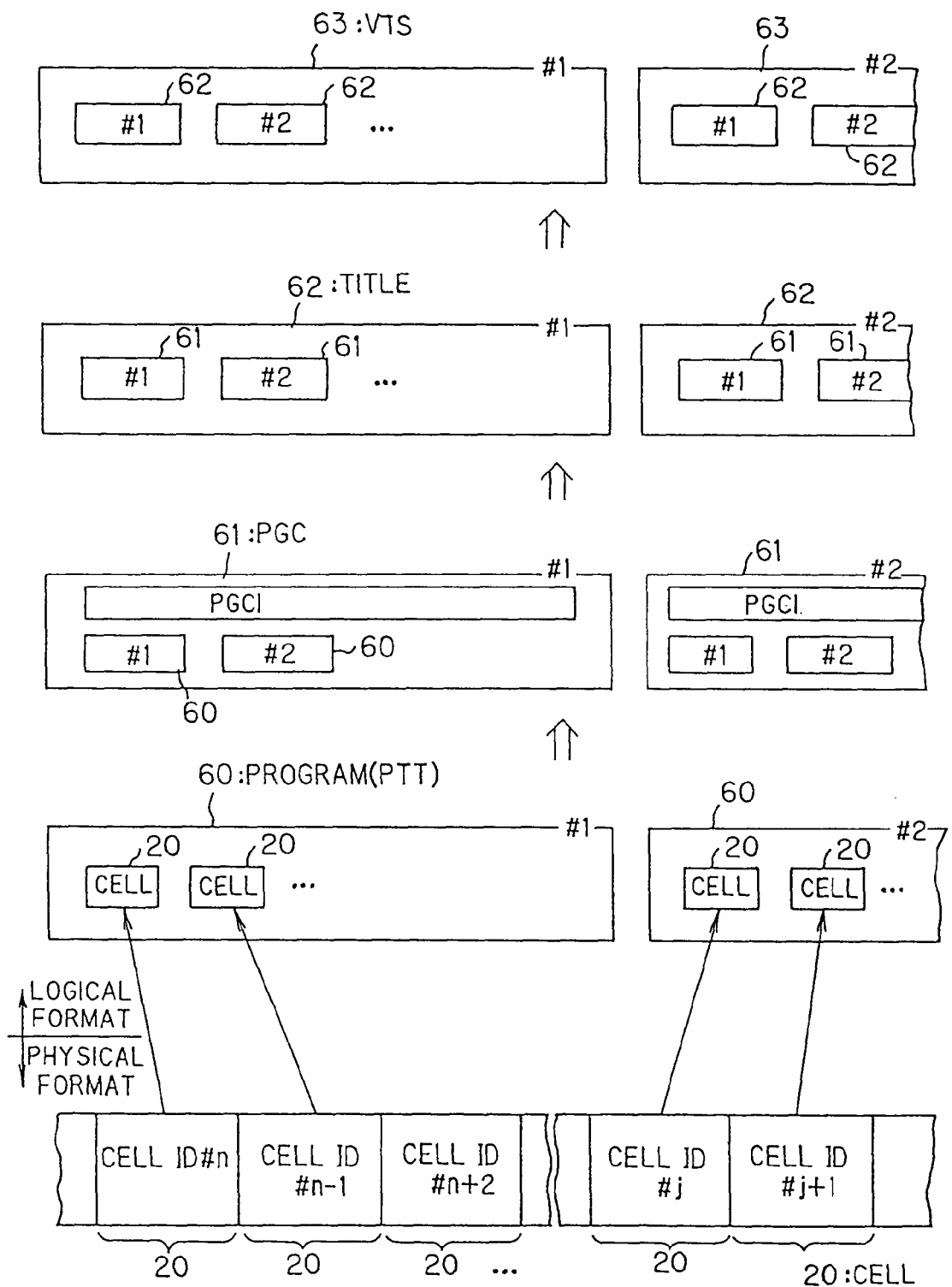
FIG. 3 shows a logical format (a logical structure) in combination with the information recorded on the basis of the physical sections as shown in FIG. 1.

To make the explanation clear, the following explanation is made from the lower hierarchical layer in FIG. 3. One program 60 is logically constructed on the basis of the authors intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (Part Of Title).

Since one program 60 is logically constructed by selecting a plurality of cells 20, it is possible to use one cell commonly for a plurality of programs 60, namely to perform a so-called alternative usage of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the authors intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61. The title 62 is, for example, a unit corresponding to one movie, and is completed information which the author would like to offer to the audience of the DVD 1.

Finally, one VTS 63 is logically constructed of one or a plurality of titles 62. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a seamless reproduction) of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the authors intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not extend over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not extend over a plurality of interleaved units IU.

The above-mentioned DVD has storage capacity which permits the recording not only of, for example, a single movie, but also of superimposed dialogues in different kinds of language corresponding to a superimposed dialogue in the above-mentioned single movie in the same optical disk. It is therefore effective to apply the above-described record format especially to the DVD 1.

(II) Embodiment of Recording Apparatus

Next, an embodiment of a recording apparatus for recording the above-mentioned control information, video information and audio information onto the DVD 1 will be explained with reference to FIGS. 5 to 7.

At first, a construction and an operation of the recording apparatus as the embodiment is explained with reference to FIG. 5.

As shown in FIG. 5, the recording apparatus S1 as the present embodiment is provided with: a VTR (Video Tape Recorder) 70; a memory 71; a signal process unit 72; a hard disk (HD) device 73; a hard disk(HD) device 74; a controller 75; a multiplexer 76; a modulator 77; a mastering device 78 and a display 79.

Next, an operation of the present embodiment is explained.

Record information R, which is a raw material such as audio information, video information, etc. to be recorded on the DVD 1, is temporarily recorded in the VTR 70. Then, the record information R temporarily recorded in the VTR 70 is outputted to the signal process unit 72 by a request from the signal process unit 72.

The signal process unit 72 applies an A/D (Analog to Digital) converting process and a signal compressing process on the basis of the MPEG 2 method to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the respective partial record information Pr is written. Then, the memory 71 outputs it as a content information signal Si on the basis of a request from the signal process unit 72.

Then, the signal process unit 72 generates and outputs an access information signal Sac corresponding to the partial record information Pr with reference to a time code Tt corresponding to the record information R outputted from the VTR 70, on the basis of the time code Tt and the content information signal Si outputted from the memory 71. Then, the access information signal Sac is temporarily stored in the hard disk device 74. The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, whose content is determined independence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 on the basis of the information selection signal Scc, to be outputted as an information-added compressed multiplexed Sap.

Then, the modulator 77 adds an error correction code (ECC), such as a Reed Solomon code, and applies a modulation such as an eight to sixteen (8-16) modulation with respect to the information-added compressed multiplexed signal Sap outputted from the multiplexer 76, and generates and outputs a disk record signal Sm to the mastering device 78.

Finally, the mastering device 78 records the disk record signal Sm on a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated. The display device 79 is provided to display necessary information to the author or the producer who produces the DVD.

Now, description will be given of the detailed operation of the system controller 75 of the recording apparatus R with reference to FIGS. 6 and 7. FIG. 6 is a descriptive view of operation of the system controller 75 and FIG. 7 is a flowchart illustrating operation of the system controller 75.

Figure 6A:
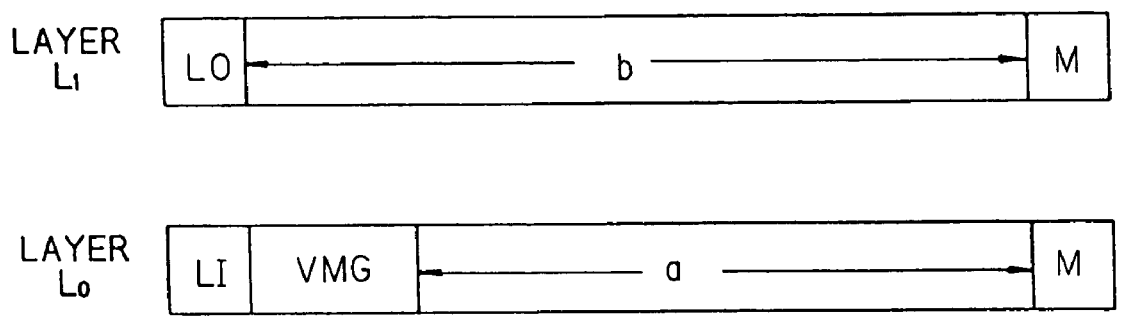
FIG. 6 is a descriptive view of operation of a system controller 75.
Figure 7:
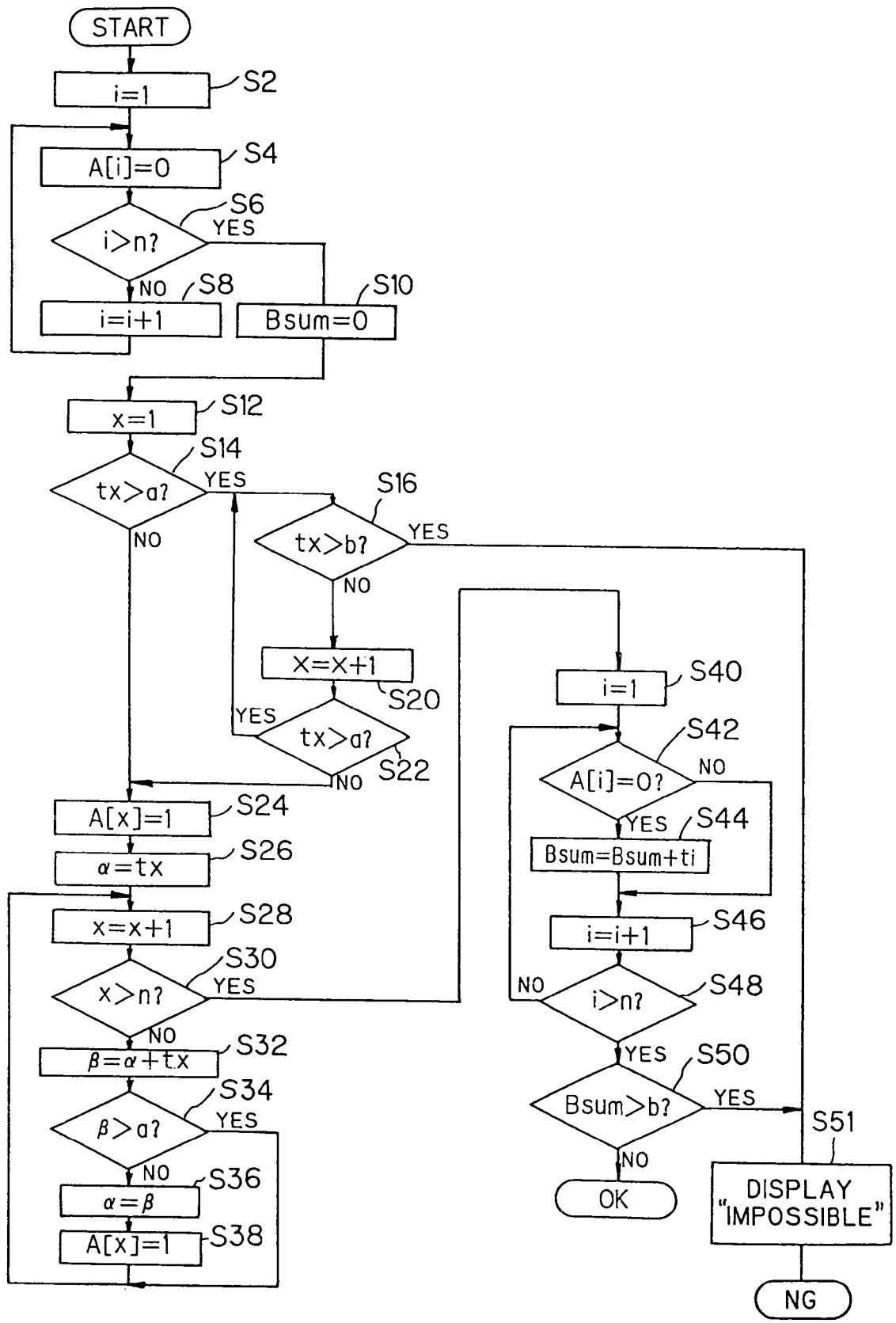
FIG. 7 is a flowchart illustrating operation of the system controller 75.

FIG. 6A shows a disk structure in which a recording layer comprises two layers. In FIG. 6A, L0 and L1 respectively indicate the recording layers which correspond to a layer 0 and a layer 1, respectively. L1 indicates a lead in area, and L0 indicates a lead out area. VGM indicates the recorded area of the video manager 2, "a" indicates a recording capacity of the layer 0, "b" indicates a recording capacity of the layer 1, and "M" indicates a medium range on which data cannot be recorded.

Figure 6B:
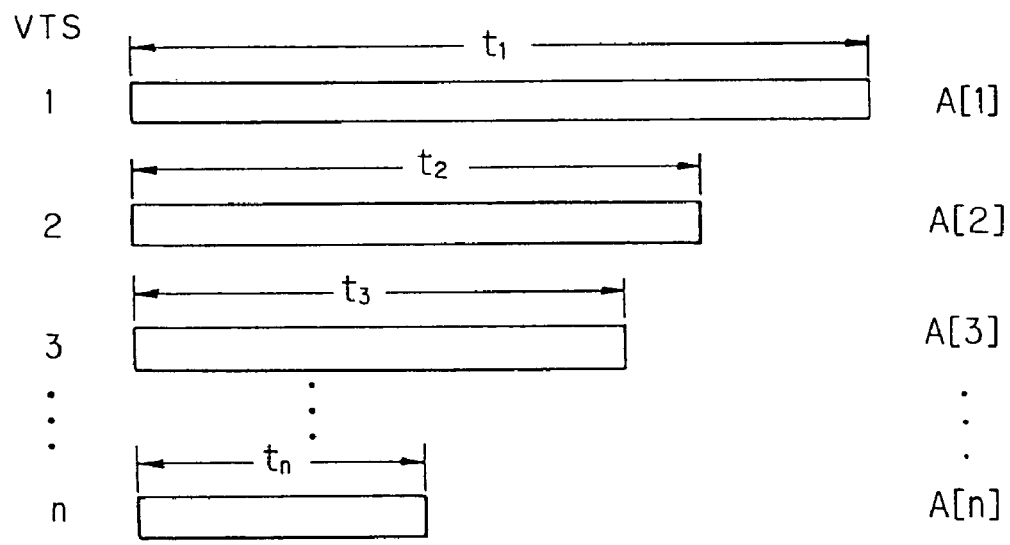

FIG. 6B shows an amount of data for each VTS, and layer identification flags A[I]. Here, "ti" (i=0, 1, 2, - - - n) indicates an amount of data of the "i"th VTS. A total number of the VTS is "n". A[i] indicates a layer identification flag of the "i"th VTS, and has an indication that in case of A[i]=1, the "i"th VTS is recorded on the layer 0, and in case of A[i]=0, the "i"th VTS is recorded on the layer 1.

Then, description will be given of the operation for recording information R of the system controller 75 with reference to FIG. 7. Here, FIG. 6 is also referred to. It is assumed that the VTSs are previously arranged in the order from the one having larger data amount to the one of smaller data amount, more specifically so as to have relationship of ti>ti+1.

First, the system controller 75 sets "i=1" (Step S2) and "A[i]=0" (Step S4), and judges as whether a value of "i" is larger than a value of "n" (Step S6). Increment of the value of "i" by one is made to repeat the aforementioned step S4 until the value of "i" becomes larger than the value of "n" (YES in Step S6) (Step S8). In these steps S4 to S8, it is provisionally determined that all VTS are recorded on the layer L1. Therefore, at the time of judgment of YES in the step S6, all the layer identification flags A[I] are set to "0". More specifically, at this time, all the VTSs are set to be recorded on the layer 1.

When the value of "i" becomes larger than the value of "n" (YES in Step S6), the system controller 75 sets "Bsum=0" (Step S10) and "x=1" (Step S12), and judges as whether or not the value of "tx" is larger than the value of "a" (Step S14). More specifically, in the step S14, it is judged as whether the value of an amount of data "tx" of the VTS is larger than the value of "a" (the storing capacity of the layer 0) in order of quantity of the amounts of data. First, in step S14, it is judged whether or not the first VTS t1 can be recorded in the layer L0. Here, Bsum is defined as a total of the amounts of data of the VTSs recorded on the layer 1.

When the value of "tx" is larger than the value of "a" (YES in Step S14), namely, "tx" (i.e., the "x"th VTS) cannot be stored on the layer 0, it is judged as whether the value of "tx" is larger than a value of "b" (the storing capacity of the layer 1) (Step S16). When the value of "tx" is larger than the value of "b" (the storing capacity of the layer 1) (YES in Step S16), there is indicated on the display 79 that the recording of "x"th VTS is impossible (step S51), as "tx" (i.e., the "x"th VTS) cannot be recorded also on the layer 1. When the value of "tx" is equal to or smaller than the value of "b" (the storing capacity of the layer 1) (NO in Step S16), on the other hand, the "x"th VTS can be recorded on the layer 1 and increment of the value of "x" by one is made (Step S20).

Then, the system controller 75 judges as whether the value of "tx" is larger than the value of "a" (the storing capacity of the layer 0) (Step S22). When the value of "tx" is larger than the value of "a" (the storing capacity of the layer 0) (YES in Step S22), the aforementioned steps S16, S18 and S20 are repeated. When the value of "tx" is equal to or smaller than the value of "a" (the storing capacity of the layer 0) (NO in Step S14 or NO in Step S22), on the other hand, "A[x]=1" (Step S24) and "α=tx" (Step S26) are set. More specifically, the "x"th VTS is determined to be recorded on the layer 0, and an amount of data of the "x"th VTS is set to a parameter α.

The system controller 75 makes increment of the value of "x" by one (Step S28) and judges as whether the value of "x" is larger than the value of "n" (Step S30). Namely, it is judged here whether or not all VTS are checked. When the value of "x" is equal to or smaller than the value of "n" (NO in Step S30), a value of "β" is calculated on the basis of the equation of β=α+tx (Step S32), and it is judged as whether the calculated value of β is larger than the value of "a" (the storing capacity of the layer 0) (Step S34). Here, β is defined as a total data amount the VTSs which are to be recorded on the layer 0. Namely, it is judged whether or not the next VTS can also be recorded on the layer 0.

When the value of β is larger than the value of "a" (the storing capacity of the layer 0) (YES in Step S34), the aforementioned steps S28, S30 and S32 are repeated. Namely, it is judged whether or not the next VTS which has smaller data amount can be recorded on the layer 0. When the value of β is equal to or smaller than the value of "a" (the storing capacity of the layer 0) (NO in Step S34), the value of α is substituted by the value of β (Step S36), "A[x]=1" is set (Step S38) and the return to the aforementioned step S28 is made. In this way, by steps S28 to S38, it is determined the set of VTSs which can be recorded on the layer 0 (i.e., the total data amount of those VTSs is less than the storing capacity "a").

When the value of "x" is larger than the value of "n" (YES in Step S30), it means that all VTSs are checked and VTSs to be recorded on the layer 0 is determined. Therefore, "i=1" is set (Step S40), and it is judged as whether A[i] is equal to zero (Step S42). In case of A[i]=0 (YES in Step S42), a value of Bsum is calculated on the basis of the equation of Bsum=Bsum+ti (Step S44), and increment of the value of "i" by one is made (Step S46). In case of A[i]=1 (NO in Step S42), increment of the value of "i" by one is made (Step S46) without calculating the value of Bsum. Then, the system controller 75 judges as whether the value of "i" is larger than the value of "n" (Step S48). When the value of "i" is equal to or smaller than the value of "n" (NO in Step S48), the aforementioned steps S42, S44, S46 and S48 are repeated. When the value of "i" is larger than the value of "n" (YES in Step S48), the calculation in the step S44 is made for all the VTSs to be recorded on the layer 1. Namely, in the steps S40 to S48, the total data amount of the VTSs which are to be recorded on the layer 1 (i.e., cannot not be recorded on the layer 0) is calculated as the Bsum. Accordingly, there is calculated a total Bsum of the amounts of data of the VTSs to be recorded on the layer 1, and then, it is judged as whether the value of Bsum is larger than the value of "b" (Step S50). When the value of Bsum is larger than the value of "b" (the storing capacity of the layer 1) (YES in Step S50), it means that those VTSs can not be recorded on the layer 1, and hence there is indicated on the display 79 that it is not possible to record the VTS (step S51), as the total Bsum of the amounts of data of the VTSs to be recorded on the layer 1 exceeds the recording capacity of the layer 1. When the value of Bsum is equal to or smaller than the value of "b" (the storing capacity of the layer 1) (NO in Step S50), it means that those VTSs can be recorded on the layer 1. Therefore, the data of the VTSs to be recorded on the layer 1 are actually recorded on the layer 1 so as to complete a processing. The aforementioned recording information R is formed in the manner as described above.

According to the information recording apparatus having the above-described structure, since the video information is recorded on the information record medium having the double-layer structure, and more specifically, each VTS is recorded on the information record medium having the double-layer structure without division of the VTS, continuous reproduction of data over the two layers is not always required, and it is possible to carry out seamless reproduction of each data group with neither increasing a capacity of a track buffer of a reproduction apparatus nor decreasing a reproduction velocity, even when switching the recording layer of the optical disk having the double-layer structure, which is in reproduction condition to another recording layer during reproduction.

Figure 8:
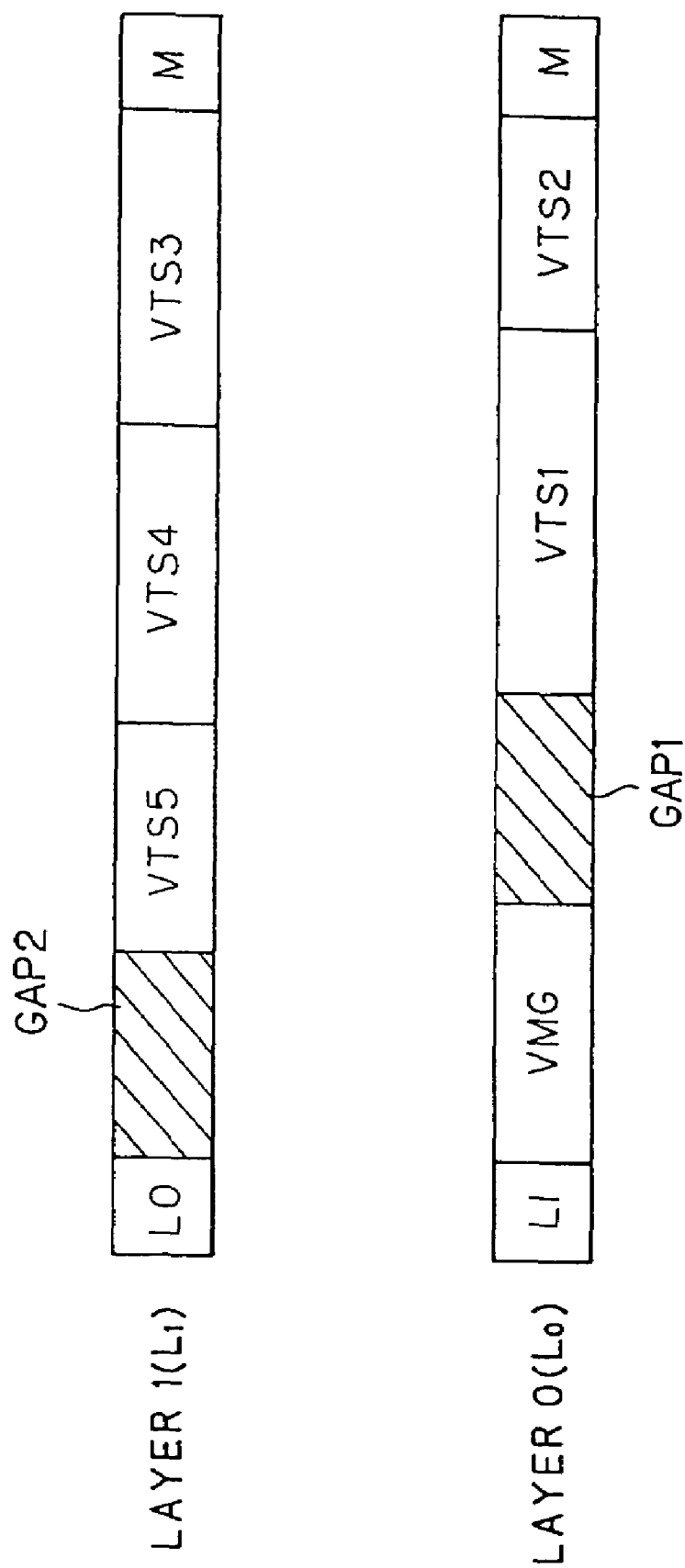
FIG. 8 shows a data structure of the information record medium on which information is recorded by means of the information recording apparatus of the present invention.

(III) Example of Information Record Medium on Which Information is Recorded by Means of the Above-described Recording Apparatus Now, description will be given of an example of the information record medium on which information is recorded by means of the above-described recording apparatus, with reference to FIG. 8. In the information record medium as shown in FIG. 8, a video manager VMG, a VTS 1 and VTS 2 are recorded on a layer 0, and a VTS 3, a VTS 4 and a VTS 5 are recorded on a layer 1. L1 indicates a lead in area, L0 indicates a lead out area, and "M" indicates a medium range on which data cannot be recorded. Information is recorded without division of each VTS, and accordingly, the layer 0 and the layer 1 are provided with the ranges GAP 1 and GAP 2 on which data are not recorded, respectively. Although, in the example as shown in FIG. 8, the VTSs are arranged together with each other on the side of the middle range, each VTS may be recorded, under an undivided condition, in an arbitrary position of each layer. A plurality of ranges (GAP) on which data are not recorded, may be provided in each layer.

According to the information record medium as shown in FIG. 8, since the video information is recorded on the information record medium having the double-layer structure, and more specifically, each VTS is recorded on the information record medium having the double-layer structure without division of the VTS, continuous reproduction of data over the two layers is not always required, and it is possible to carry out seamless reproduction of each data group with neither increasing a capacity of a track buffer of the reproduction apparatus nor decreasing a reproduction velocity, even when switching the recording layer of the optical disk having the double-layer structure, which is in reproduction condition to another recording layer during reproduction.

As described above in detail, according to the information record medium of the present invention, since the data group having at least one of video information and audio information is recorded as a minimum unit on the first recording layer having the first recording capacity, and the data group having at least one of video information and audio information is recorded as a minimum unit on the second recording layer having the second recording capacity, it is possible to carry out seamless reproduction of each data group with neither increasing a capacity of a track buffer of the reproduction apparatus nor decreasing a reproduction velocity, even when switching the recording layer of the optical disk having the double-layer structure, which is in reproduction condition to another recording layer during reproduction.

According to the information recording apparatus of the present invention, a total of amounts of data detected by means of the data-amount detecting means is sequentially calculated, upon recording a plurality of data groups each having at least one of video information and audio information, on the information record medium provided with the first recording layer having the first recording capacity and the second recording layer having the second recording capacity; and each data group is sequentially recorded on the first recording layer when the total of the amounts of data the thus calculated is judged to be equal to or smaller than the first recording capacity; thus leading to a construction in which each data group is recorded as a minimum unit on the information record medium having the double-layer structure. As a result, continuous reproduction of data over the two layers is not always required, upon reproducing information recorded on the information record medium. It is therefore possible to carry out seamless reproduction of each data group with neither increasing a capacity of a track buffer of the reproduction apparatus nor decreasing a reproduction velocity, even when switching the recording layer of the optical disk having the double-layer structure, which is in reproduction condition to another recording layer during reproduction.

What is claimed is:

1. An information record medium readable by an information reproducing apparatus, the information record medium including a first recording layer on which a data group is recorded; and a second recording layer on which a data group is recorded, wherein on the first recording layer, a lead-in area is formed and management information for the whole of recording information, and the data group are recorded; on the second recording layer, a lead-out area is formed and a data group is recorded; the lead-in area is formed at the inner radius side of the information record medium; and the lead-out area is formed at the inner radius side of the information record medium, the information record medium further comprising:

a mid area at the outer radius side of the first recording layer; and another mid area at the outer radius side of the second recording layer.

2. The information record medium according to claim 1, wherein the first recording layer comprises the lead-in area, the management information, the data group, and the mid area in that order from the inner radius side of the first recording layer.

3. The information record medium according to claim 1, wherein the second recording layer comprises the mid area, the data group, and the lead-out area in that order from the outer radius side of the second recording layer.

4. The information record medium according to claim 1, wherein the data group comprises: control data; and at least either video information or audio information.

5. A recording apparatus comprising: a signal processing device which generates additional information including a data group and management information for the whole of recording information; and a recording device which records, after a lead-in area, the management information and a data group on a first recording layer of an information record medium and records, after a lead-out area, a data group on a second recording layer of the information record medium, wherein the lead-in area is formed at the inner radius side of the information record medium, and the lead-out area is formed at the inner radius side of the information record medium, wherein a mid area is formed at the outer radius side of the first recording layer, and another mid area is formed at the outer radius side of the second recording layer.

6. The recording apparatus according to claim 5, wherein the first recording layer comprises the lead-in area, the management information, the data group, and the mid area in that order from the inner radius side of the first recording layer.

7. The recording apparatus according to claim 5, wherein the second recording layer comprises the mid area, the data group, and the lead-out area in that order from the outer radius side of the second recording layer.

8. The recording apparatus according to claim 5, wherein the data group comprises: control data; and at least either video information or audio information.

9. A recording method comprising: a signal processing process for generating additional information including a data group and management information for the whole of recording information; and a recording process for recording, after a lead-in area, the management information and a data group on a first recording layer of an information record medium and for recording, after a lead-out area, a data group on a second recording layer of the information record medium, wherein the lead-in area is formed at the inner radius side of the information record medium, and the lead-out area is formed at the inner radius side of the information record medium, wherein a mid area is formed at the outer radius side of the first recording layer, and another mid area is formed at the outer radius side of the second recording layer.

10. The recording method according to claim 9, wherein the first recording layer comprises the lead-in area, the management information, the data group, and the mid area in that order from the inner radius side of the first recording layer.

11. The recording method according to claim 9, wherein the second recording layer comprises the mid area, the data group, and the lead-out area in that order from the outer radius side of the second recording layer.

12. The recording method according to claim 9, wherein the data group comprises: control data; and at least either video information or audio information.

13. The information record medium according to claim 1, wherein said data group comprises control data and substantive information, said substantive information comprising a plurality of cells, said control data comprising information relating to a program chain which is a logical unit comprising a combination of a plurality of programs, said programs comprising a combination of said cells, said cell comprising a plurality of video object units, said video object units comprising at least one of a navigation pack, a video pack, an audio pack, and a sub picture pack, said navigation pack comprising a packet of search information and a packet relating to display control, said video packet comprising a video packet, said audio packet comprising an audio packet, and said sub picture pack comprising a sub picture packet.

14. The recording apparatus according to claim 5, wherein said data group comprises control data and substantive information, said substantive information comprising a plurality of cells, said control data comprising information relating to a program chain which is a logical unit comprising a combination of a plurality of programs, said programs comprising a combination of said cells said cell comprising a plurality of video object units, said video object units comprising at least one of a navigation pack, a video pack, an audio pack, and a sub picture pack, said navigation pack comprising a packet of search information and a packet relating to display control, said video packet comprising a video packet, said audio packet comprising an audio packet, and said sub picture pack comprising a sub picture packet.

15. The recording method according to claim 9, wherein said data group comprises control data and substantive information, said substantive information comprising a plurality of cells, said control data comprising information relating to a program chain which is a logical unit comprising a combination of a plurality of programs, said programs comprising a combination of said cells, said cell comprising a plurality of video object units, said video object units comprising at least one of a navigation pack, a video pack, an audio pack, and a sub picture pack, said navigation pack comprising a packet of search information and a packet relating to display control, said video packet comprising a video packet, said audio packet comprising an audio packet, and said sub picture pack comprising a sub picture packet.

16. An information record medium readable by an information reproducing apparatus, the information record medium including a first recording layer on which a data group is recorded; and a second recording layer on which a data group is recorded, the information record medium further comprising:

on the first recording layer, a lead-in area is formed, the data group is recorded, and a mid area is formed in a direction from the inner radius side of the information record medium to the outer radius side of the information record medium; and on the second recording layer, a lead-out area is formed, a data group is recorded, and a mid area is formed in a direction from the inner radius side of the information record medium to the outer radius side of the information record medium.

17. The information record medium according to claim 16, wherein said data group comprises control data and substantive information, said substantive information comprising a plurality of video object units, said control data comprising information relating to a program which is a logical unit comprising a combination of a plurality of video object units, said video object units comprising at least one of a video pack, an audio pack, and a sub picture pack, said video packet comprising a video packet, said audio packet comprising an audio packet, and said sub picture pack comprising a sub picture packet.

18. A recording apparatus comprising: a signal processing device which generates additional information including a data group; and a recording device which records, after a lead-in area, a data group on a first recording layer of an information record medium and records, after a lead-out area, a data group on a second recording layer of the information record medium, wherein the lead-in area is formed at the inner radius side of the information record medium, and the lead-out area is formed at the inner radius side of the information record medium, wherein a mid area is formed at the outer radius side of the first recording layer, and another mid area is formed at the outer radius side of the second recording layer.

19. The recording apparatus according to claim 18, wherein said data group comprises control data and substantive information, said substantive information comprising a plurality of video object units, said control data comprising information relating to a program which is a logical unit comprising a combination of a plurality of video object units, said video object units comprising at least one of a video pack, an audio pack, and a sub picture pack, said video packet comprising a video packet, said audio packet comprising an audio packet, and said sub picture pack comprising a sub picture packet.

20. A recording method comprising: a signal processing process for generating additional information including a data group; and a recording process for recording, after a lead-in area, a data group on a first recording layer of an information record medium and for recording, after a lead-out area, a data group on a second recording layer of the information record medium, wherein the lead-in area, is formed at the inner radius side of the information record medium, and the lead-out area is formed at the inner radius side of the information record medium, wherein a mid area is formed at the outer radius side of the first recording layer, and another mid area is formed at the outer radius side of the second recording layer.

21. The recording method according to claim 20, wherein said data group comprises control data and substantive information, said substantive information comprising a plurality of video object units, said control data comprising information relating to a program which is a logical unit comprising a combination of a plurality of video object units, said video object units comprising at least one of a video pack, an audio pack, and a sub picture pack, said video packet comprising a video packet, said audio packet comprising an audio packet, and said sub picture pack comprising a sub picture packet.

* * * * *